No. 659,158. Patented Oct. 2, 1900.
W. SCHLABACH.
FERTILIZER DISTRIBUTING ATTACHMENT.
(Application filed May 16, 1900.)
(No Model.)
2 Sheets—Sheet 1.

WITNESSES:
Louis Dieterich
E. McCormic

INVENTOR
William Schlabach
BY
Fred G. Dieterich & Co.
ATTORNEYS

UNITED STATES PATENT OFFICE.

WILLIAM SCHLABACH, OF NORDHEIM, TEXAS.

FERTILIZER-DISTRIBUTING ATTACHMENT.

SPECIFICATION forming part of Letters Patent No. 659,158, dated October 2, 1900.

Application filed May 16, 1900. Serial No. 16,868. (No model.)

*To all whom it may concern:*

Be it known that I, WILLIAM SCHLABACH, residing at Nordheim, in the county of De Witt and State of Texas, have invented certain new and useful Improvements in Fertilizer-Distributing Attachments, of which the following is a specification.

This invention is in the nature of an improved means for drilling compost, manure, or other fertilizing material; and it primarily has for its object to provide a very simple and inexpensive attachment for the purposes stated adapted to be quickly attached to any ordinary farm-wagon and which will expeditiously and effectively serve for its intended purposes.

In its complete make-up my invention comprises a suitably-arranged hopper having a straight pendent bottom trough closed at one end, the other end being open, an adjustable boot or discharge-spout secured to the open end of the trough and adapted to be conveniently set in different directions to properly lead the fertilizer into the furrow, a screw feed-shaft mounted in the trough to carry the material to the desired end thereof, a novel construction of brackets in which the trough is detachably supported and which have securing means whereby they can be quickly attached to or detached from the bed-boards of the end portion of the wagon-body, and driving means for detachably joining the conveyer-shaft with one of the drive-wheels, all of which will hereinafter be fully described in detail and then pointed out in the appended claims, reference being had to the accompanying drawings, in which—

Figure 1:
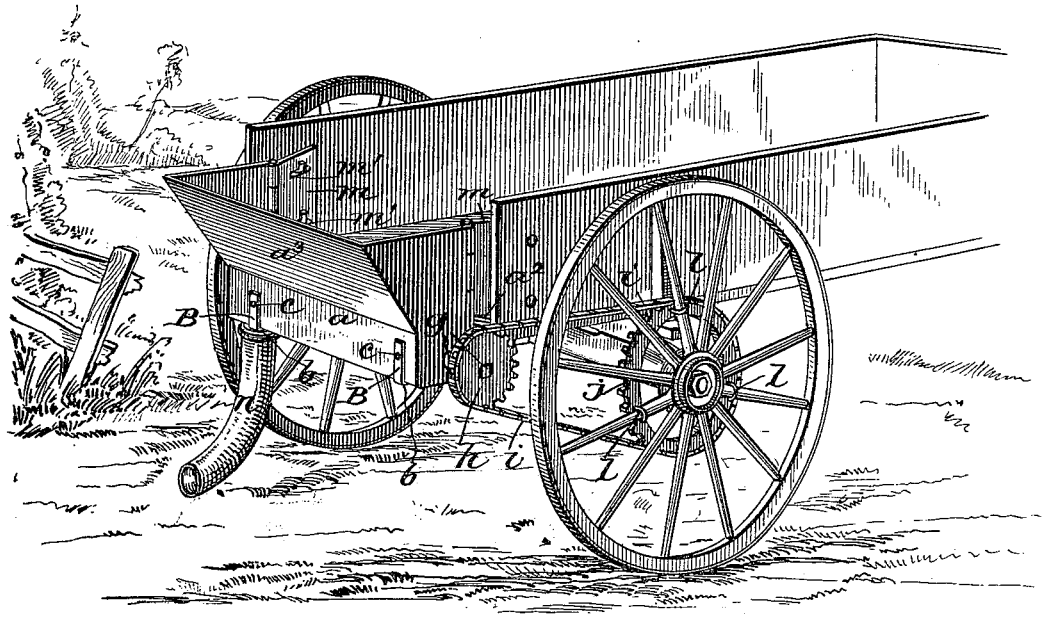
Figure 4:
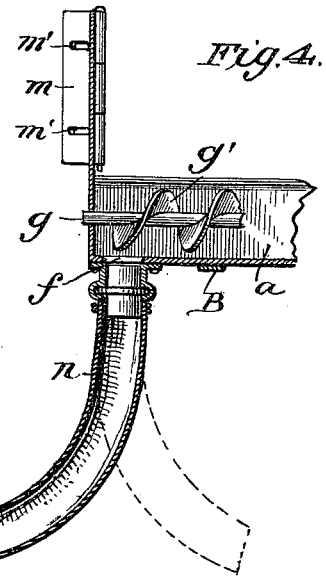
Figure 5:
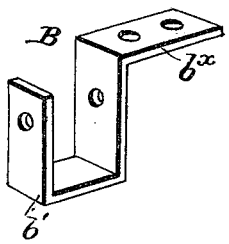
Figure 2:
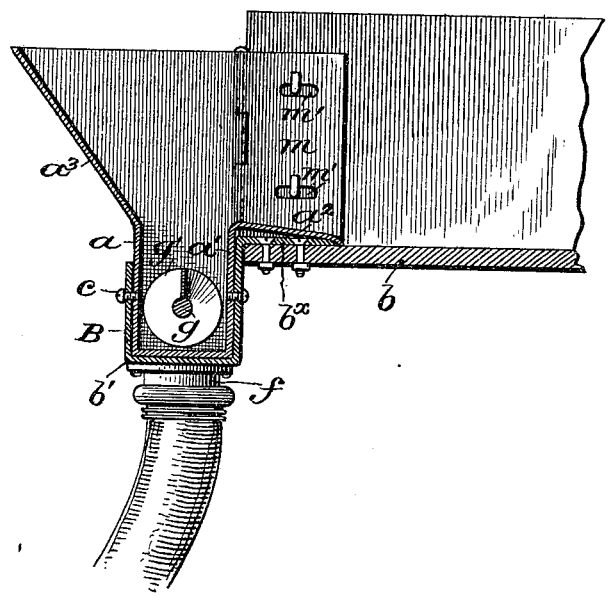
Figure 3:
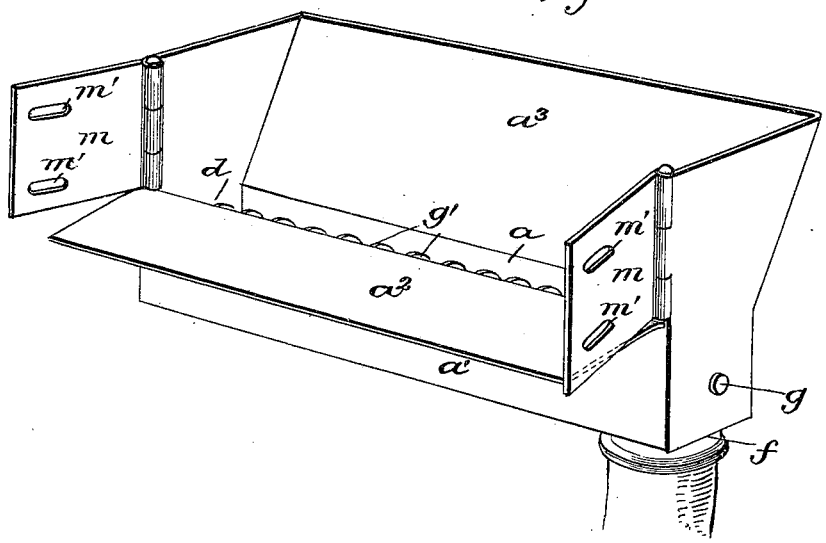

Figure 1 is a perspective view of a farm-wagon equipped with my improved fertilizer-distributing attachment. Fig. 2 is a longitudinal section of the end portion of the wagon-bed and a transverse section of the fertilizer attachment. Fig. 3 is a perspective view of the fertilizer attachment detached. Fig. 4 is a detail view illustrating the manner in which the adjustable boot or discharge-spout is connected with the trough. Fig. 5 is a perspective view of one of the supporting-brackets hereinafter specifically referred to.

In its practical construction my improved attachment comprises a trough having a pendent portion $a$, adapted when the improvement is applied to a wagon end to project below the wagon-bottom, as clearly shown in Fig. 2, by reference to which it will also be seen that the front wall $a'$ of the portion $a$ extends up slightly above the wagon-bottom $b$ and merges with the inwardly-extending inclined portion $a^2$, which laps over the outer end of the wagon-bed and serves to brace the trough portion, and also acts as a bridge or guide to prevent dropping the manure or other fertilizing material down between the end of the wagon-bed and the front wall of the trough. The rear wall of the trough is extended upward and terminates in an outwardly-inclined hopper-wall $a^3$, which serves to deflect the manure into the trough proper as it (the manure) is shoveled into the trough from the inside of the wagon.

To provide for quickly attaching my improvement to the end of the wagon-bed and to hold the same secure, it is supported upon two or more metal brackets B, each consisting of a horizontally-extended member $b$, adapted to be bolted to the bottom of the wagon-bed end, as shown, and a U-shaped portion $b'$, which fits the lower portion of the trough, said trough when fitted therein being securely held by the clamp bolts or screws $c$. (See Fig. 2.)

One end of the trough is closed, as at $d$, and the other end has a bottom discharge $f$ for the escape of the fertilizing material which is shoveled into the trough. To cause the fertilizer to feed toward the discharge $f$, a conveyer-shaft $g$ is journaled longitudinally in the pendent or bottom part of the trough, and the said shaft carries a spiral $g'$, so arranged and caused to travel in such direction as to carry the material to the open end of the trough. The ends of the shaft $g$ are journaled in the end walls of the trough, and one end of the said shaft is extended and carries upon it a chain-wheel $h$, belted by a chain $i$ with the chain-wheel $j$ of much larger diameter than the wheel $h$, said wheel $j$ in practice being detachably secured to one of the drive-wheels by the clip-bolts $l\,l$, as clearly shown in the drawings.

The trough or hopper body is made of a length approximately the width of the ordinary farm-wagon body; but to provide for a convenient attachment of the same to farm-wagons of different widths the opposite ends of the inner wall of the trough have each a lateral or wing portion $m$, pivotally connected at its inner end to the trough-body and having the outer edge slotted, as at $m'$, to engage with bolts or lugs on the inner face of the wagon side.

The wings $m$ serve to close off any space at the ends of the trough and also act as deflectors to properly guide the material into the trough, they also serving as brace members for supporting the trough in position.

$n$ indicates a boot or spout held with its mouth over the discharge-opening of the trough. This spout is mounted upon the lower edge of the trough and is adjustably held thereon, as shown, whereby it can be conveniently set to lead the material properly into the furrow.

I am aware that fertilizer-distributing attachments have been heretofore provided which include a screw conveyer and delivery-trough; but my distributing means or driller, so far as I know, differentiates from the same in the novel and simplified manner in which it is suspended upon the wagon-bed, the end wings for deflecting the material, and the peculiar construction of the hopper and trough.

In operation the material is shoveled from the wagon-body into the trough and the same is carried to the discharge by the screw conveyer, from whence it is delivered through the boot or spout into the furrow.

To remove the device from the wagon-bed, it is only necessary to remove the brackets B and lift the wing members from engagement with the studs or bolts upon the sides of the wagon-body and release the clip-bolts that secure the large chain-wheel upon the drive-wheel, it being understood that in securing the large sprocket-wheel to the drive wheel the same can be placed upon the outside of the spoke, so as to facilitate the ready removal of the said wheel and the other parts of the attachment when desired.

It will be noticed that no change whatsoever will be necessary in a farm-wagon and that my improved device is capable of being connected to any of the ordinary styles of wagons without in the slightest altering any part thereof.

Having thus described my invention, what I claim, and desire to secure by Letters Patent, is—

1. A fertilizer-distributing attachment for farm-wagons, comprising a hopper having a pendent trough-like bottom closed at one end and open at the other, the open end having a discharge-spout, the wing members hinged to the front wall of the trough portions, said wing members being laterally adjustable and adapted to extend over the inner faces of the remaining ends of the conveyer-shaft in the trough, and means driven from the wagon-wheel for operating the conveyer, substantially as shown and described.

2. The combination with the wagon end; of the hopper having a pendent trough portion provided with a discharge, the conveyer operating within the trough for leading the material to the discharge; the inner wall of the trough having an inwardly and downwardly extending flange adapted to project over the end of the wagon-bed and means for operating the conveyer adapted to be connected with and driven from one of the wagon-wheels as specified.

3. The hereinbefore-described improvement in fertilizer-distributing attachments for farm-wagons, comprising a hopper having a pendent trough portion extending its full length and having a discharge at one end, a boot or spout adjustably connected to the discharge end of the said trough having an inwardly-extending flange adapted to fit over the outer end of the wagon-bed and having pivotally-connected wing members at the opposite ends adapted to swing outward against the inner face of the rear ends of the side members of the wagon, the conveyer operatively held within the trough portion and means for driving the conveyer, substantially as shown and for the purposes described.

WILLIAM SCHLABACH.

Witnesses:
C. H. BLANTON,
E. G. GILLETT.